United States Patent [19]

Tadokoro et al.

[11] Patent Number: 5,107,409
[45] Date of Patent: Apr. 21, 1992

[54] OPTICAL HEAD FOR OPTICAL INFORMATION RECORDING/REPRODUCING APPARATUS

[75] Inventors: Michihiro Tadokoro; Kazuo Okada, both of Amagasaki, Japan

[73] Assignee: Mitsubishi Denki Kabushiki Kaisha, Tokyo, Japan

[21] Appl. No.: 480,016

[22] Filed: Feb. 13, 1990

[30] Foreign Application Priority Data

Feb. 22, 1989 [JP] Japan .................. 1-18931[U]

[51] Int. Cl.⁵ .............................. F21V 15/04
[52] U.S. Cl. ........................... 362/369; 362/259;
362/268; 362/390; 369/44.15
[58] Field of Search ............ 362/259, 268, 369, 390,
362/800; 350/500; 369/44.13, 122, 44.16, 44.15

[56] References Cited

U.S. PATENT DOCUMENTS 4,363,961 12/1982 Okada et al. .................. 250/201.3
4,571,715 2/1986 Kato et al. .................... 369/44.16

FOREIGN PATENT DOCUMENTS 61-132528 8/1986 Japan .
63-15661 4/1988 Japan .
2190094 11/1987 United Kingdom .

OTHER PUBLICATIONS

Patent Abstracts of Japan, vol. 10, No. 312 (P-509), Head Moving Device, 61-12295, Jun. 10, 1986, p. 53.
Patent Abstracts of Japan, vol. 9, No. 304 (P-409), Objective Lens Driver, 60-136924, Jul. 20, 1985, p. 106.
Patent Abstracts of Japan, vol. 10, No. 34, (P-427), Optical Information Processing Unit, 60-182028, Sep. 17, 1985, p. 81.
Patent Abstracts of Japan, vol. 13, No. 54 (P-824), Objective Lens Driver, 63-244328, Oct. 11, 1988, p. 49.

*Primary Examiner*—Stephen F. Husar
*Attorney, Agent, or Firm*—Morrison Law Firm

[57] ABSTRACT

An optical head for use in an optical information recording/reproducing apparatus includes an optical system comprising a plurality of optical elements including a light-emitting element, and a casing which securely mounts at least part of the optical elements. The casing is provided with a vibration damping material which is effective to damp vibrations of the casing.

8 Claims, 12 Drawing Sheets

OPTICAL HEAD FOR OPTICAL INFORMATION RECORDING/REPRODUCING APPARATUS

This invention relates to an optical head for use in an optical information recording/reproducing apparatus.

BACKGROUND OF THE INVENTION

Figure 1:
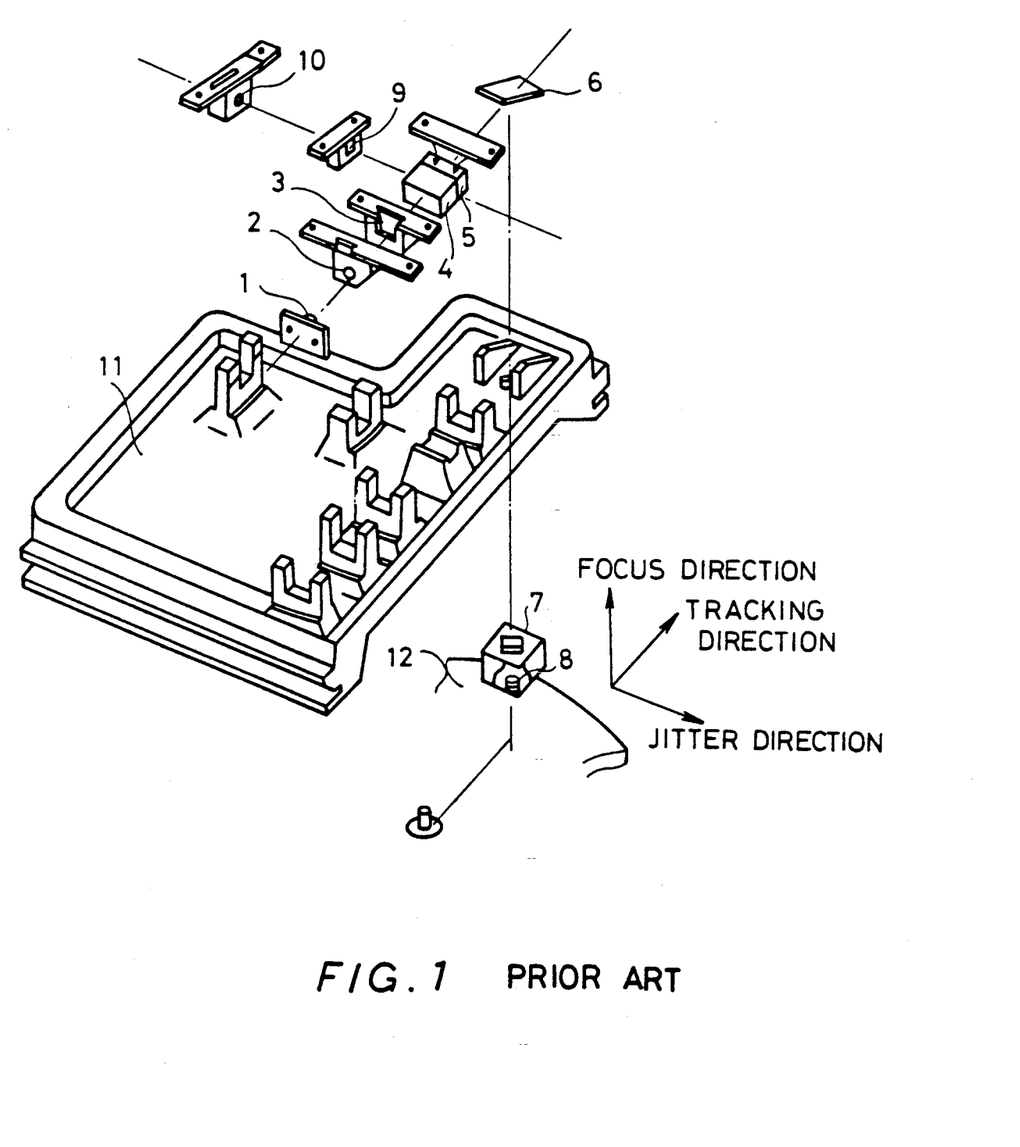
FIG. 1 is an exploded, perspective view of a conventional optical head.

FIG. 1 is a perspective exploded view of a conventional optical head arrangement, which is shown in Japanese Patent Publication No. SHO 63-15661.

A laser diode 1 acting as a point light source emits a diverging laser beam that impinges on a condenser lens 2. The laser beam is collimated by the condenser lens 2 and, then, passes through a diffraction grating 3 to reach a polarizer prism 4.

The laser beam entering into the polarizer prism 4 has been polarized in a predetermined direction so that the beam can pass through the prism without changing its direction.

The beam that has passed through the polarizer prism 4 enters into a λ/4 plate (quarter-wave plate) 5 where linear polarization is converted to circular polarization. The beam then reaches a mirror 6 which deflects the beam by 90° so that the beam impinges on an actuator 7. The beam is projected through an objective lens 8 in the actuator 7 onto an information medium 12.

In the surface of the information medium 12, there are formed tracks with a spacing of several microns between adjacent tracks. Pits having a depth of λ/4 are arranged in the tracks, where λ is the wavelength of the laser beam. The presence of the pits is detected by moving the optical head relative to the information medium in the direction in which the tracks extend, whereby signals are read out from the information medium 12.

When the information medium 12 is rotating, the spacing between the objective lens 8 and the information medium 12 varies due to variations in flatness of the surface of the information medium 12. In order to maintain this spacing constant, the position of the actuator 7 in the direction of the optical axis (hereinafter referred to as focus direction) is automatically controlled so that the laser beam is always focused to a spot having a diameter of about 1 micron on the surface of the information medium 12 in which the pits are formed.

The position of the actuator 7 is also controlled relative to the tracks in the medium 12 in a direction perpendicular to the direction of the length of the track and, hence, in the radial direction of the medium (hereinafter referred to as tracking direction) so that the laser beam spot does not go out of position with respect to a particular track being detected.

The position of the actuator 7 is also controlled in the direction along which the tracks extend. (Hereinafter, this direction is referred to as the jitter direction.)

Practically, the three-dimensional control of the position of the actuator 7, namely, the control in the focus, tracking and jitter directions, may be achieved in the following manner. For example, the control of the position of the actuator 7 in the focus direction may be carried out by moving the actuator 7 itself, and as for the control in the tracking and jitter directions, two oscillatory mirrors provided in the actuator 7 may be moved instead of moving the actuator 7, or use of such an oscillatory mirror may be combined with electrical processing. The actuator 7 is moved in the three directions so as to accommodate itself to error in flatness of the information medium 12 or to the eccentricity of the tracks, whereby the laser beam is always focused to a spot having a diameter of about 1 micron on a particular track being detected. Thus, stable recovery or recording of a signal from or into the information medium 12 can be achieved.

Since the direction of traveling of the laser beam reflected from the information medium 12 is reversed by 180° relative to the incoming beam, it is circular-polarized with rotation in the opposite direction to the incoming beam. This reflected laser beams travels along the same optical path as the incoming beam to reach the λ/4 plate 5 where it is converted to a linear-polarized beam of which the direction is rotated λ/2 relative to the polarized beam emitted by the laser diode 1. The linear-polarized beam is deflected 90° by the polarizer prism 4 to pass through a cylindrical lens 9, which is used to control the position of the actuator 7 in the focus direction. The beam which has passed through the lens 9 impinges onto a detector 10.

The respective optical elements disposed along the optical path extending from the laser diode 1 to the detector 10 are in their particular positions predetermined relative to the optical axis of the laser beam and are secured in position with a high precision with respect to a casing 11.

Figure 2:
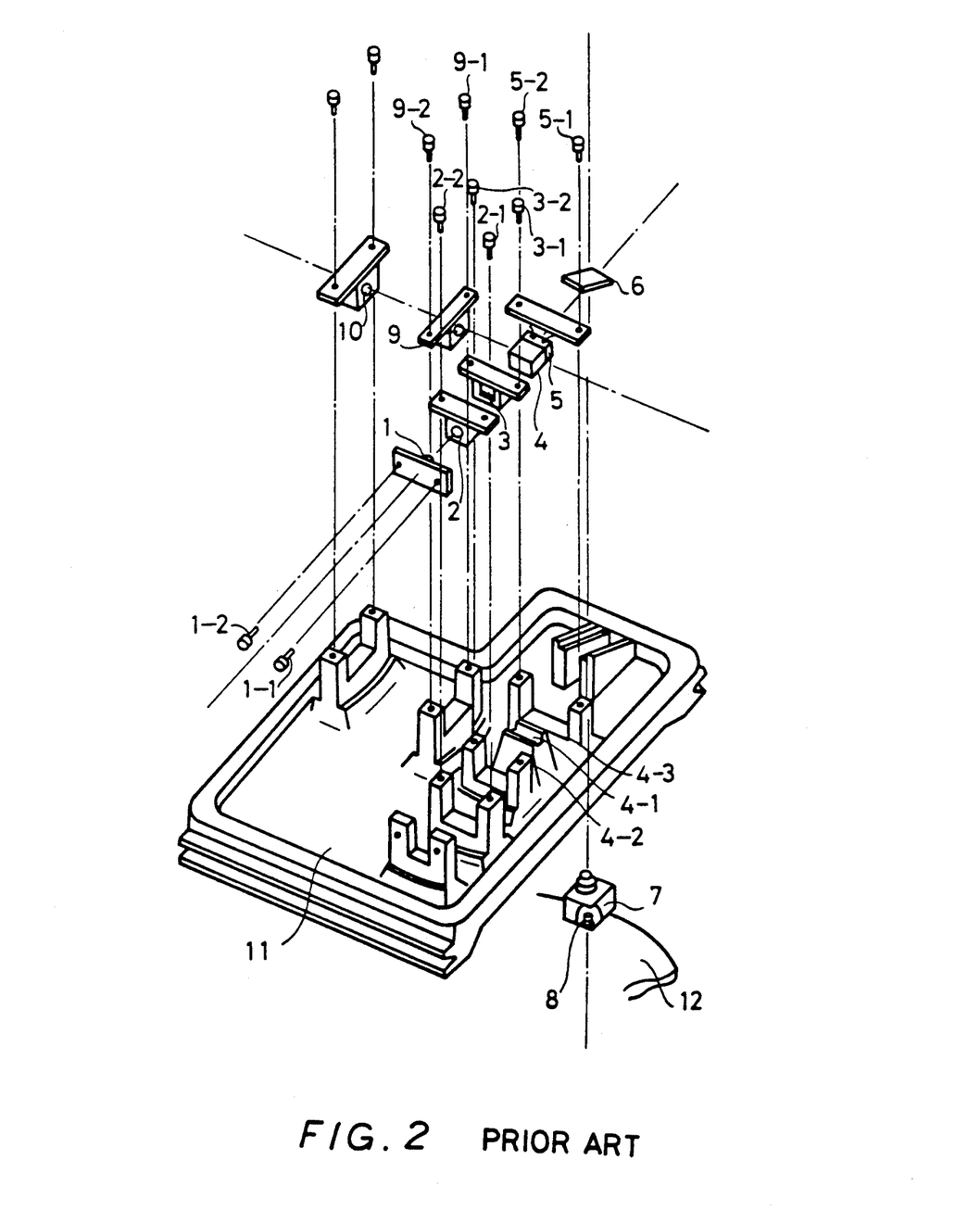
FIG. 2 illustrates how the elements of the optical head shown in FIG. 1 are assembled.

FIG. 2 illustrates how the above-described optical elements are mounted to the casing 11. The respective optical elements are secured to the casing 11 by means of screws 1-1, 1-2, . . . 9-1, 9-2. However, the polarizer prism 4 and the mirror 6 are secured in place by bonding adhesive to associated surface portions of the casing 11.

Various configurations for the casing 11 have been proposed. The above-described configuration is a reduced-thickness type in which various optical elements are arranged in a single plane that is parallel to the plane of the surface of the information medium 12. Another configuration is a vertical type in which various optical elements are arranged in a plane that is perpendicular to the plane of the surface of the information medium 12. One example is shown in Japanese Unexamined UM Publication No. SHO 61-132528.

In view of the purpose of reducing the thickness of optical information recording/reproducing apparatus, the reduced-thickness type casing described above may be preferable.

However, since a number of optical elements are mounted thereon, the area of the portions of the casing that are parallel to the plane of the surface of the information medium 12 is large, and, therefore, the casing of this type may suffer from mechanical resonance.

Figure 3A:
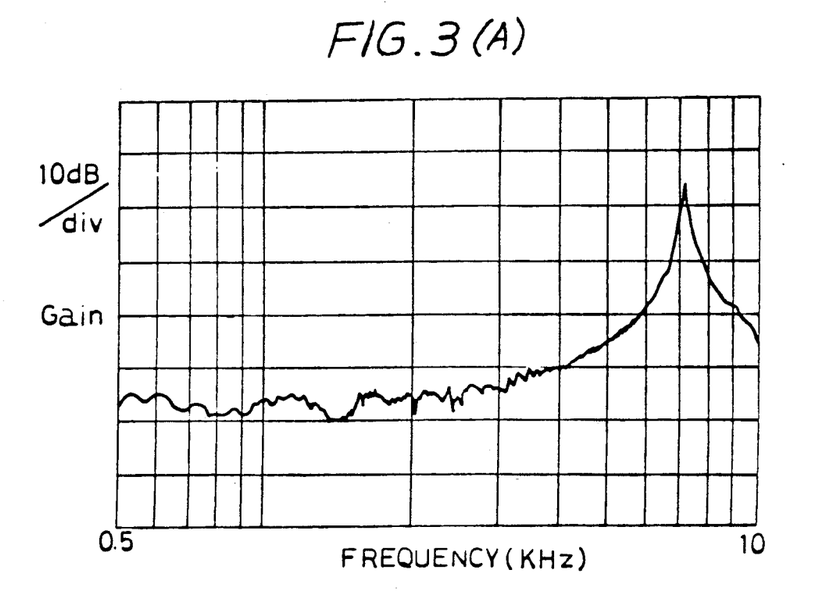
FIGS. 3(A) and 3(B) show gain-versus-frequency and phase-versus-frequency characteristic curves of the casing of FIG. 1, respectively, useful for understanding mechanical resonance.
Figure 3B:
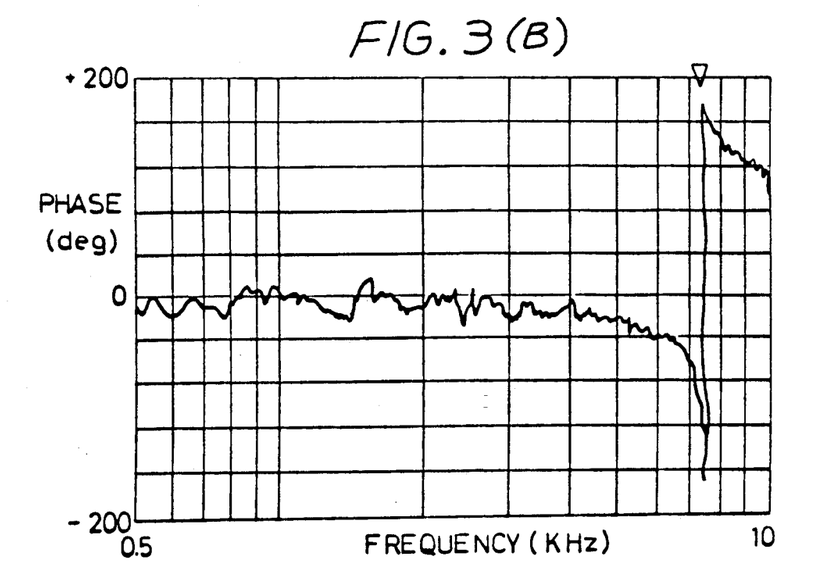

Now, mechanical resonance of the casing is considered. Generally, an optical head resonates at a certain frequency $f_1$. Characteristics of an optical head are shown in FIGS. 3(A) and 3(B). FIG. 3(A) shows a gain characteristic curve, while FIG. 3(B) shows a phase characteristic curve. In the illustrated example, the gain is at a peak at a frequency of 7.3 KHz, and also the phase is inverted by 180° at 7.3 KHz. Thus, it is seen that this point is a resonant frequency point. The presence of such a resonant point can pose a problem on servo control such as focus control, tracking control and jitter control stated previously.

In principle, when the gain at the resonant point exceeds the servo loop gain, it is no longer possible to provide the servo control, and, therefore, it becomes impossible to focus the laser beam to a spot of about 1 micron diameter on the surface of the information medium 12. As a result, proper recording and recovering of information cannot be done, which degrades the quality of information. In the worst case, no servo control can be achieved and, hence, recording and recovery of information cannot be done.

Of course, if the mechanical resonant frequency $f_1$ is higher than a frequency band of interest for the servo control, there will be no problem.

However, in the reduced-thickness type of optical heads, such as the conventional optical head shown in FIG. 1, the resonant frequency $f_1$ is still lower and the peak of the gain (Q) is still higher.

An optical information recording/reproducing system to be used as an peripheral unit for a computer is required to have an average access time that is short. Accordingly, the optical head has to be able to move at a high speed in the radial direction of an information medium. In order for the optical head to be able to move fast in the radial direction of the information medium, it has to be light in weight, which requires that the casing be made as lightweight as possible and that unnecessary portions be eliminated as much as possible. However, in such a structure, the problem relating to the mechanical resonance becomes more serious.

If the head tends to mechanically resonate, it cannot move at a high speed even if it is made light-weight, and the servo control is adversely affected, as stated previously. That results in degradation of information quality or, in the worst case, failure of information recording or recovery.

As stated in the above, while the structure of the casing of the example described above is advantageously suitable for reducing the thickness of the casing, it is accompanied by the mechanical resonance problem.

SUMMARY OF THE INVENTION

The object of the present invention is to eliminate the above-stated problems of conventional optical heads, by providing an optical head for an optical information recording/reproducing system, which is less adversely affected by mechanical resonance so that degradation of information quality can be prevented, and which can be made light-weight and thin.

According to the present invention, a vibration damping material is applied to a casing by, for example, bonding it to a surface of the casing, filling cavities formed in the casing with the vibration damping material or/and filling moats formed in wall sections of the casing with the vibration damping material. The vibration damping material serves to damp vibrations at the resonant frequency of the optical head, which results in reduction of Q. Thus, the optical head according to the present invention is less affected by mechanical vibrations.

DETAILED DESCRIPTION OF PREFERRED EMBODIMENTS

Now, the present invention is described in detail with reference to the accompanying drawings which show embodiments of the present invention.

Figure 4:
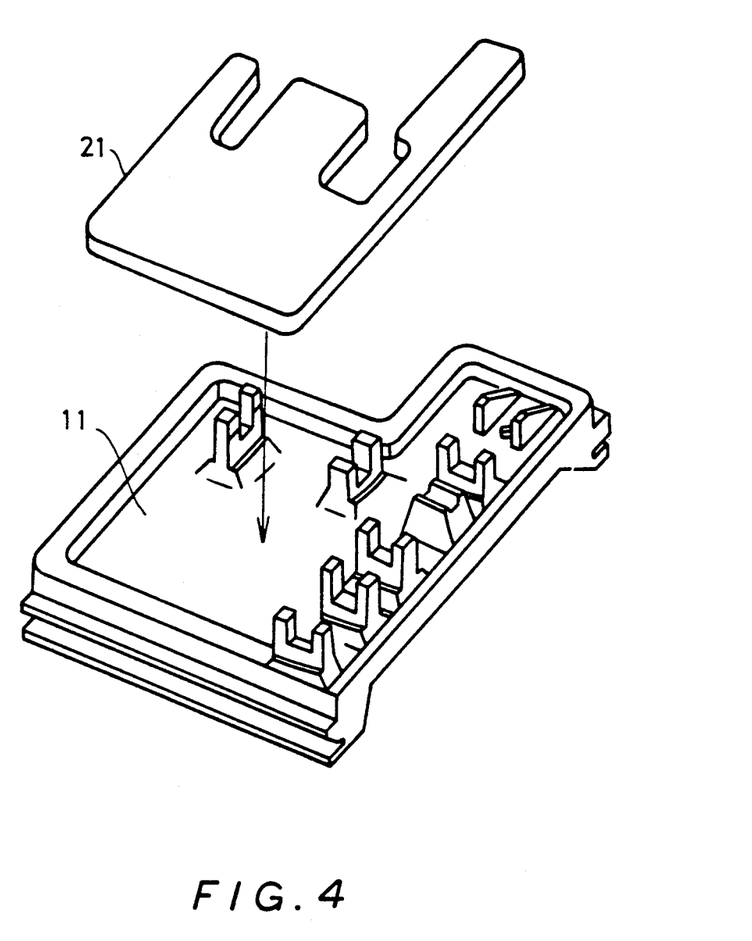
FIG. 4 is an exploded, perspective view of a portion of an optical head according to one embodiment of the present invention.

Referring to FIG. 4, a casing 11 which can be used in a first embodiment of the invention has a structure the same as that of the previously described conventional apparatus, except that a vibration damping material 21, which may be, for example, a synthetic rubber, such as urethane, silicone, neoprene or like rubber, is bonded to the casing 11 by means of, for example, an adhesive.

Figure 5:
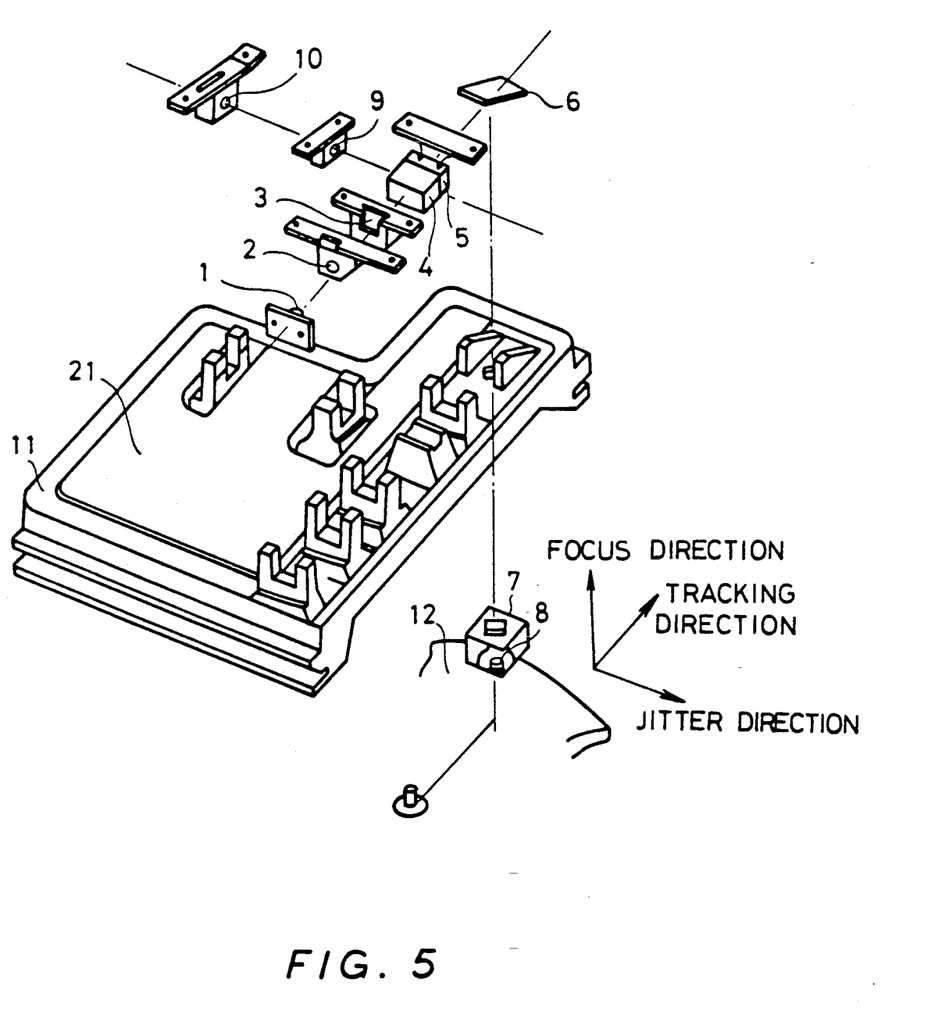
FIG. 5 is an exploded, perspective view of the entire structure of the optical head of FIG. 4.

FIG. 5 shows the entire structure of an optical head using the casing shown in FIG. 4 in accordance with the first embodiment of the present invention. In FIG. 5, elements with reference numerals 1-12 are similar or equivalent to the elements of the previously described conventional apparatus to which the same reference numerals are attached. Therefore no further explanation about them is made here.

In operation, the optical head of this embodiment resonates at a mechanical resonant point $f_1$. However, since the vibration damping material 21 is bonded to the casing 11, the resonant vibration energy of the casing 11 is absorbed in the form of heat energy by the vibration damping material 21. In other words, although mechanical resonance occurs at the same frequency $f_1$, a peak of the gain (Q) at the resonant point $f_1$ is reduced by the vibration damping material 21 relative to an optical head without a vibration damping material attached to it.

Accordingly, even if the resonant point of the optical head is within the servo control frequency band of a control system, the servo loop gain is not easily exceeded by external disturbance because of the low Q, and, therefore, the desired servo control can be provided properly. Thus, because the vibration damping material 21 can reduce the Q factor to a sufficiently low value, degradation of the quality of recorded or reproduced information or failure to record or reproduce information which could otherwise be caused by the presence of resonance can be avoided.

Furthermore, according to the present invention, the thickness of the casing can be reduced further, or the casing can be fabricated more light-weight by removing unnecessary portions as much as possible.

For the purpose of reducing the weight of the optical head, expanded plastics may also be suitably used as a vibration damping material.

Figure 6:
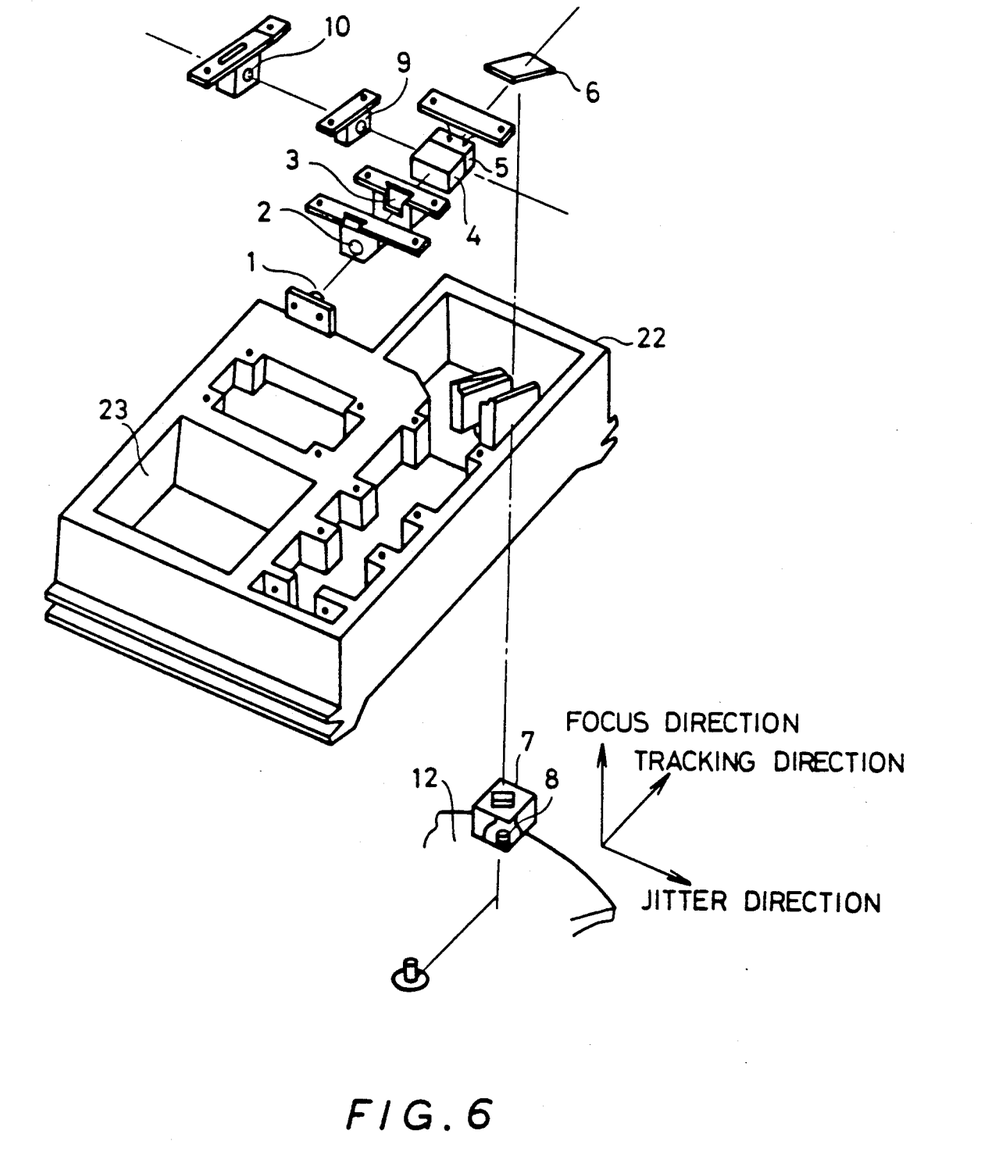
FIGS. 6 and 7 are exploded, perspective views of an optical head according to another embodiment of the present invention before and after a vibration damping material is bonded to or filled into appropriate portions of the casing, respectively.
Figure 7:
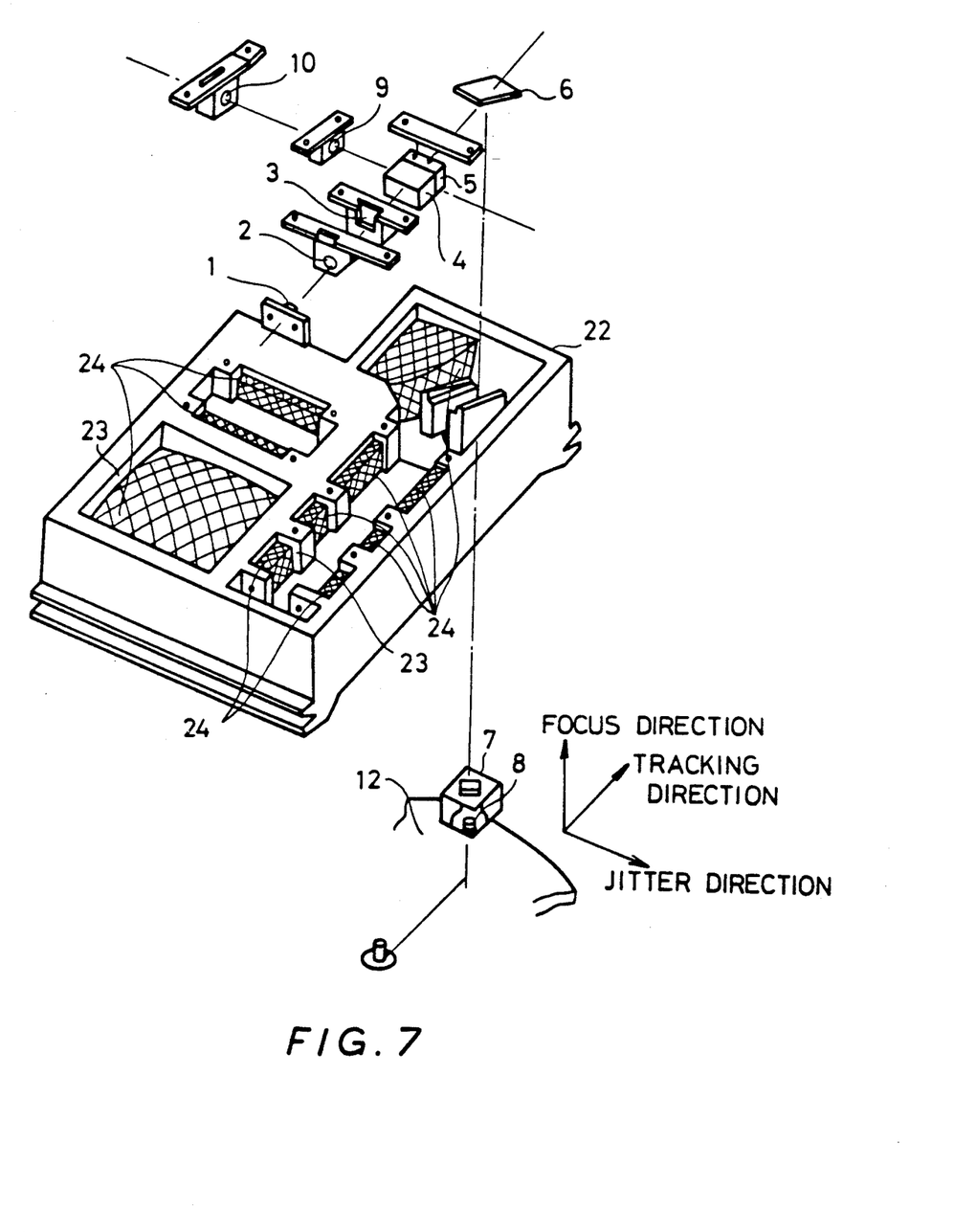

FIG. 6 shows an optical head according to a second embodiment of the present invention, which employs a box-shaped casing 22. As shown in FIG. 7, a vibration damping material 24 is filled into or bonded to walls of cavities 23 formed in the casing 22. The cavities 23 shown in FIGS. 6 and 7 are formed for the special purpose of reducing the weight of the optical head. In his box-shaped casing 22, too, the vibration damping material 24 performs similar functions as in the first embodiment.

Figure 8:
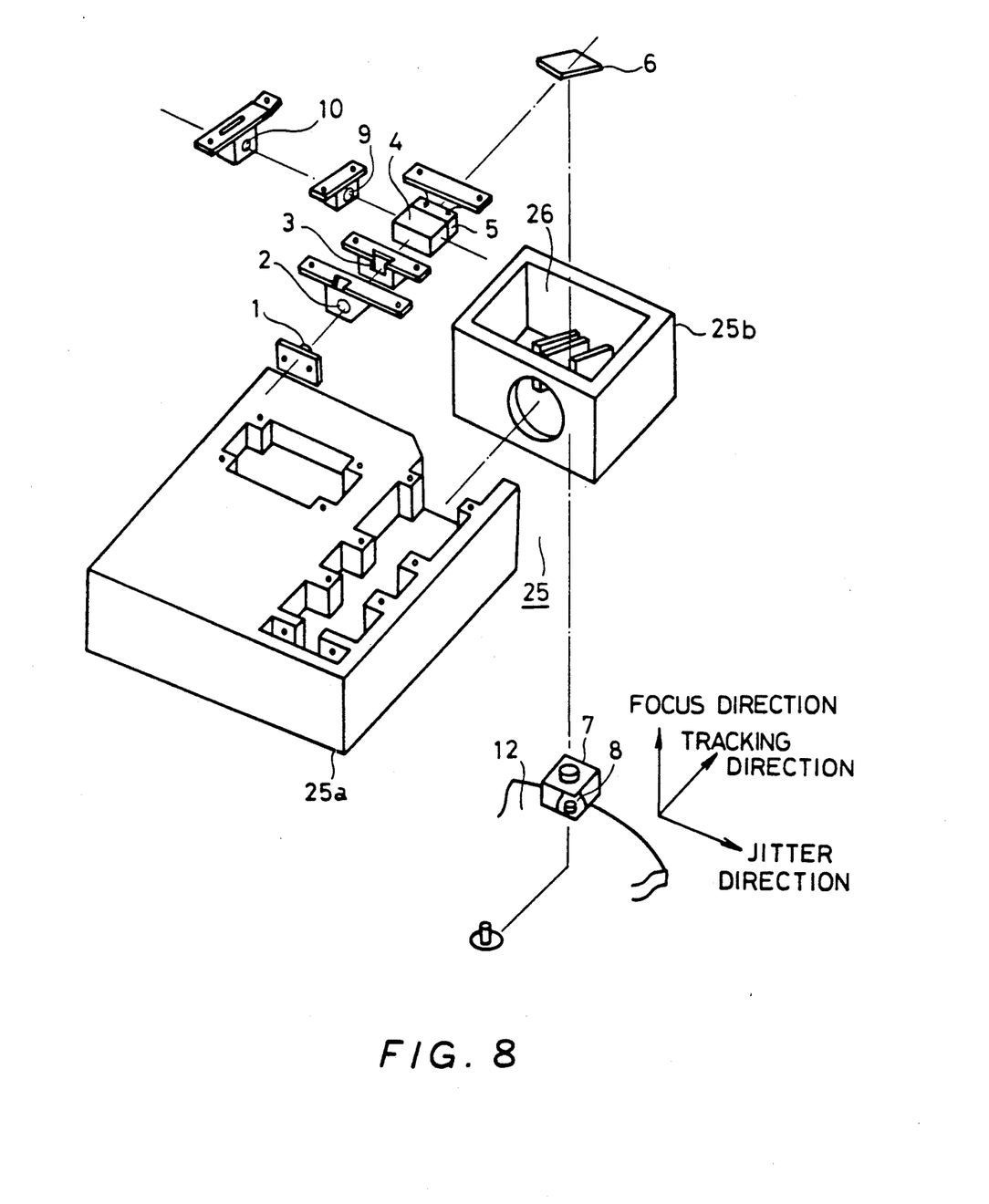
FIGS. 8 and 9 are exploded, perspective views of an optical head according to still another embodiment of the present invention before and after a vibration damping material is bonded to or filled into appropriate portions of the casing, respectively.

FIG. 8 is perspective, exploded view of a separate type optical head comprising a casing 25. The casing 25 comprises a fixed portion 25a and a removable portion 25b.

Figure 9:
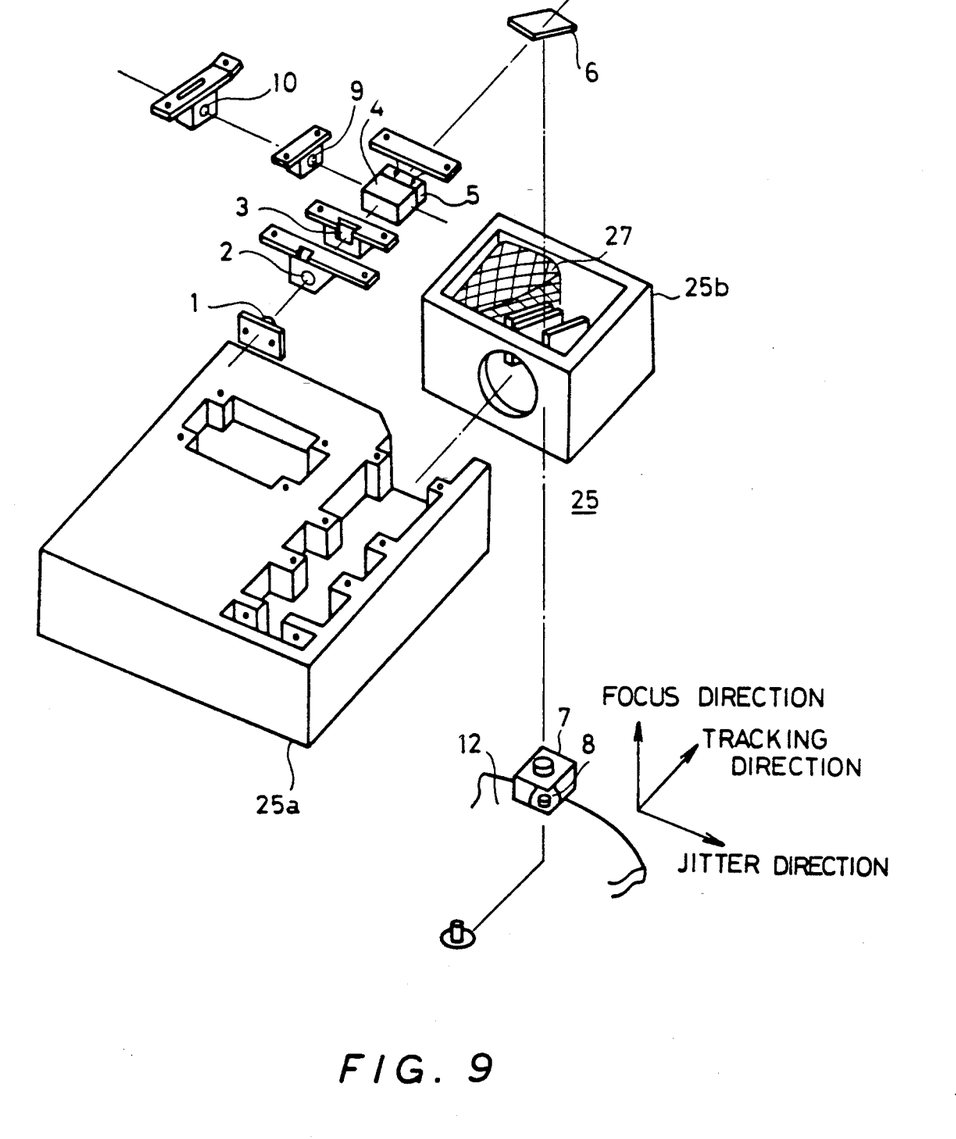

FIG. 9 shows the optical head shown in FIG. 8 which includes a vibration damping material 27 bonded within a cavity 26 formed in the removable casing portion 25b. This vibration damping material 27 functions to reduce the Q factor at the resonant point of the removable casing section 25b.

In the embodiments shown in FIGS. 4–9, the vibration damping materials 21, 24 and 27 are bonded to the walls of the interior sections or filled into the cavities of the casings 11, 22 and 25, but they can be bonded to the exterior of the casings for similar effects.

Figure 10:
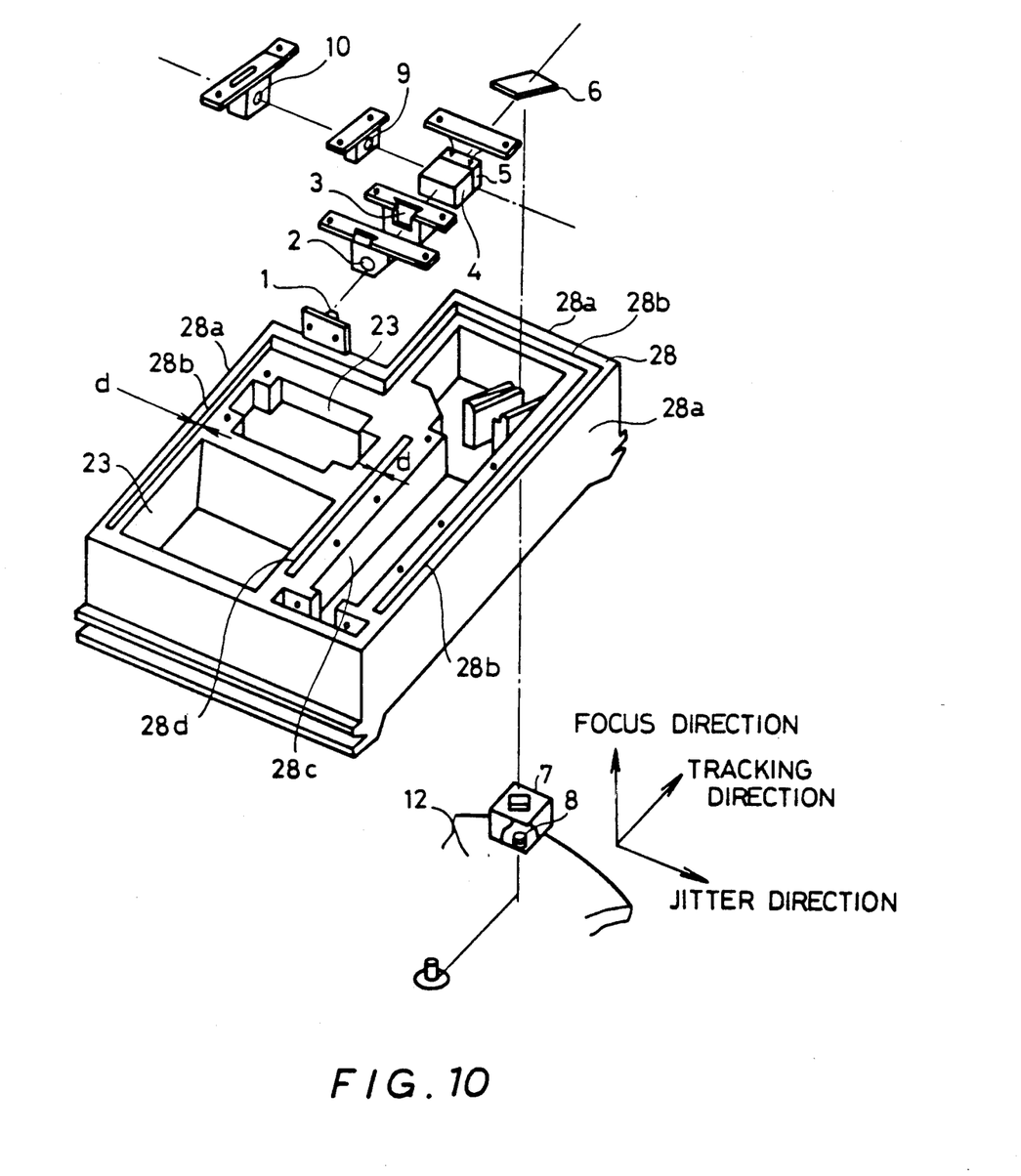
FIGS. 10 and 11 are exploded, perspective views of an optical head according to a still further embodiment of the present invention before and after a vibration damping material is bonded to or filled into appropriate portions of the casing, respectively.
Figure 11:
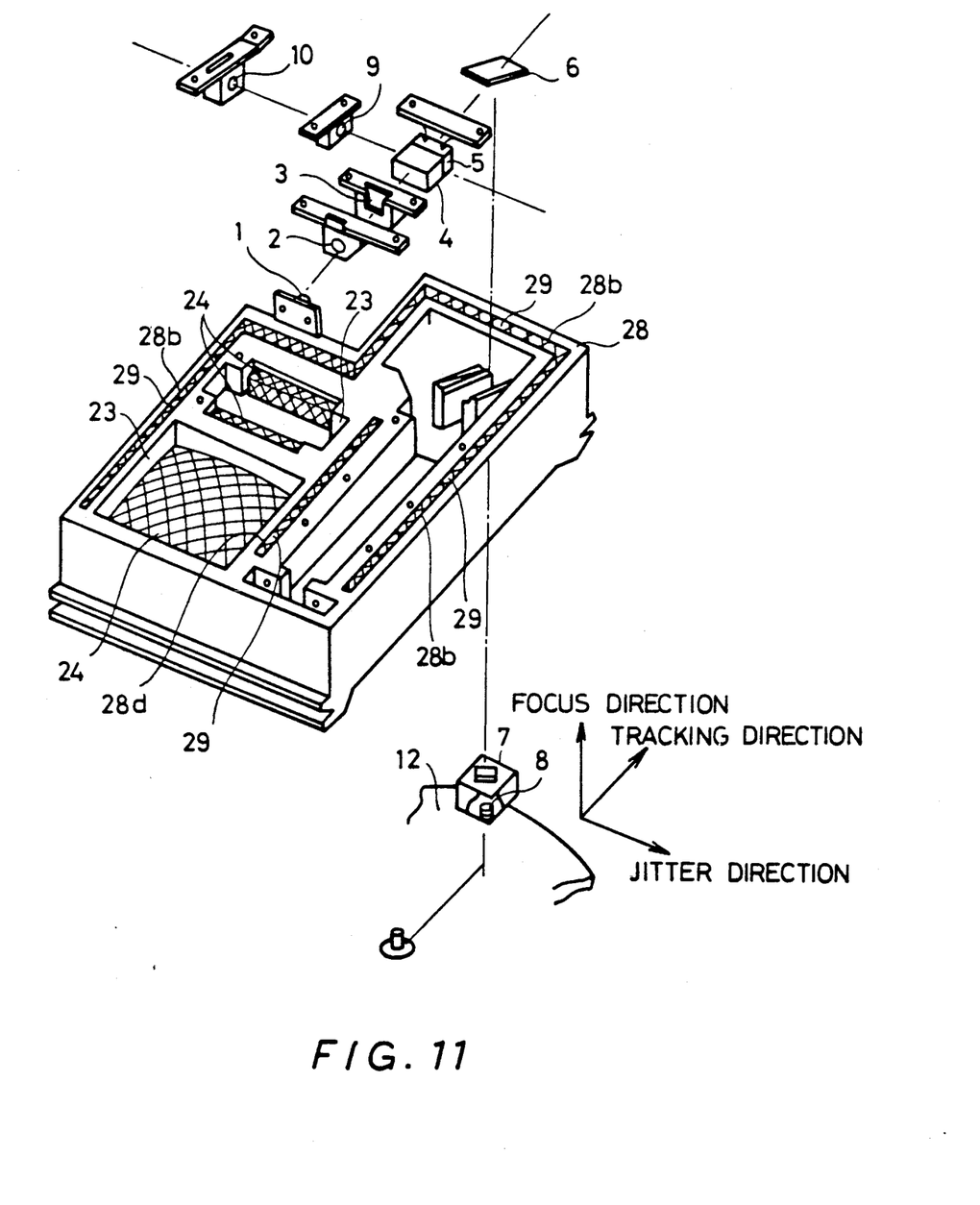

FIGS. 10 and 11 show still another embodiment of the present invention which manifests advantages of the present invention more clearly. The casing 28 of this embodiment, as shown n FIG. 10, includes moats 28b in the peripheral walls 28a thereof and also a moat 28d in a central partition wall 28c. The depth of he moats is larger than the width d of the opening of the moats. As shown in FIG. 11, the moats 28b and 28d as well as cavities 23 are filled with vibration damping material indicated by 24 and 29. The vibration damping material may be filled into the moats and the cavities or bonded to the walls of the moats and the cavities.

Now, the effect achieved by filling the moats 28b and 28d with the vibration damping material 29 is explained in contrast to the effect achieved by bonding the vibration damping material (21, 24, 27) to surfaces of the casing (11, 22, 25, 28).

Figure 12:
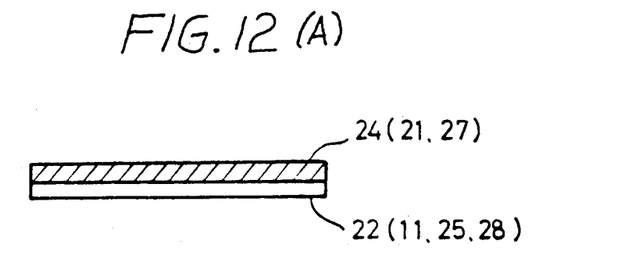
FIGS. 12(A) and 12(B) are useful for explaining the function of the vibration damping material disposed in moats shown in FIG. 11.

FIG. 12(A) is a schematic representation of the vibration damping material (21, 24, 27) applied onto the surfaces of the casing (11, 22, 25, 28), and FIG. 12(B) is a schematic representation of the vibration damping material (29) sandwiched between walls of the casing (28).

The vibration damping material 29 filled into the moats 28b and 28d shown in FIG. 11 corresponds to FIG. 12(B). In the structure shown in FIG. 12(A), one side of the vibration damping material 24 is not restrained but free, whereas the vibration damping material 29 shown in FIG. 12(B) is in contact at opposite sides thereof with the casing 28 so that its movement is restricted by the casing walls. Accordingly, the vibration damping material 29 shown in FIG. 12(B) of which opposite sides are restrained by the casing walls can absorb more vibration energy than the structure shown in FIG. 12(A). In other words, the Q factor at the mechanical resonant point of the structure of FIG. 12(B) is lower than that of the structure of FIG. 12(A).

As described above, an optical head for use in an optical information recording/reproducing apparatus according to the present invention has its Q factor at the mechanical resonant point thereof minimized by bonding a vibration damping material to surfaces of a casing of the optical head or filling such a vibration damping material into cavities formed in the casing or into moats formed in wall portions of the casing. Thus, adverse effects produced by mechanical resonance of the optical head are reduced, whereby degradation of information can be prevented. Furthermore, the optical head can advantageously be made light-weight and thin.

Although the present invention has been described in terms of the reduced thickness type optical head, it should be understood that the invention can be applicable to other optical heads, such as the vertical type described previously.

What is claimed is:

1. An optical head for use in an optical information recording/reproducing apparatus, said optical head comprising:
   a casing;
   a plurality of optical elements, said optical elements being fixed to said casing; and
   at least one body of vibration damping material, said vibration damping material being disposed within said casing in energy transferring contact therewith.

2. The optical head of claim 1, wherein said body of vibration damping material is bonded to a surface of said casing.

3. The optical head of claim 1, wherein said casing includes an upstanding peripheral wall portion, said wall portion being formed with at least one moat, and a body of said vibration damping material being disposed in said moat in energy transferring contact with a surface thereof.

4. The optical head of claim 3, wherein said casing is formed with at least one cavity, and a body of said vibration damping material is disposed in said cavity in energy transferring contact with a surface thereof.

5. The optical head of claim 3 or 4, wherein the depth of said moat is greater than the width of the opening of said moat.

6. An optical head for use in an optical information recording/reproducing apparatus, said optical head comprising:
   a casing;
   a plurality of optical elements, said optical elements being fixed to said casing; and
   at least one body of vibration damping material, said vibration damping material being disposed in energy transferring contact with said casing;
   said casing being formed with at least one cavity, and a body of said vibration damping material being disposed in said cavity in energy transferring contact with a surface thereof.

7. The optical head of claim 1, 2, 6, 3 or 4, wherein said vibration damping material is a synthetic rubber.

8. The optical head of claim 1, 2, 6, 3 or 4, wherein said vibration damping material is an expanded plastic resin.

* * * * *